United States Patent
Fan

(10) Patent No.: US 10,731,276 B2
(45) Date of Patent: Aug. 4, 2020

(54) PREPARATION METHOD OF POLYESTER CORD FABRIC WITH LOW DENIER AND HIGH MODULUS

(71) Applicants: Oriental Industries(Su Zhou) LTD, Suzhou (CN); Continental Reifen Deutschland GmbH, Germany (DE)

(72) Inventor: Datsai Fan, Hsinchu (CN)

(73) Assignees: Oriental Industries (Su Zhou) LTD, Suzhou (CN); Continental Reifen Deutschland GmbH (DE)

( * ) Notice: Subject to any disclaimer, the term of this patent is extended or adjusted under 35 U.S.C. 154(b) by 583 days.

(21) Appl. No.: 15/519,539

(22) PCT Filed: Nov. 19, 2015

(86) PCT No.: PCT/CN2015/094964
§ 371 (c)(1),
(2) Date: Apr. 15, 2017

(87) PCT Pub. No.: WO2016/078596
PCT Pub. Date: May 26, 2016

(65) Prior Publication Data
US 2017/0241047 A1    Aug. 24, 2017

(30) Foreign Application Priority Data
Nov. 21, 2014  (CN) .......................... 2014 1 0676232

(51) Int. Cl.
| | | |
|---|---|---|
| *D01F 6/62* | (2006.01) | |
| *D03D 15/00* | (2006.01) | |
| *B29C 70/50* | (2006.01) | |
| *B29D 30/38* | (2006.01) | |
| *B60C 9/00* | (2006.01) | |
| *D02G 3/48* | (2006.01) | |
| *B60C 9/11* | (2006.01) | |
| *B05D 1/18* | (2006.01) | |
| *D01D 5/08* | (2006.01) | |
| *B60C 9/04* | (2006.01) | |

(52) U.S. Cl.
CPC ................ *D01F 6/62* (2013.01); *B05D 1/18* (2013.01); *B29C 70/50* (2013.01); *B29D 30/38* (2013.01); *B60C 9/0042* (2013.01); *B60C 9/11* (2013.01); *D01D 5/08* (2013.01); *D02G 3/48* (2013.01); *D03D 15/00* (2013.01); *B60C 2009/0071* (2013.01); *B60C 2009/0078* (2013.01); *B60C 2009/0425* (2013.01); *B60C 2009/0433* (2013.01)

(58) Field of Classification Search
CPC ... D01F 6/62; D02G 3/48; D01D 5/08; B05D 1/18; B29C 70/50; D03D 15/00; B29D 30/38; B60C 2009/0433; B60C 2009/0425; B60C 2009/0078; B60C 2009/0071; B60C 9/11; B60C 9/0042
See application file for complete search history.

(56) References Cited

U.S. PATENT DOCUMENTS

| | | | | |
|---|---|---|---|---|
| 4,416,935 | A * | 11/1983 | Bascom .................. | D02G 1/165 139/420 A |
| 4,763,468 | A * | 8/1988 | Brown ..................... | D02J 1/22 264/210.7 |
| 10,125,436 | B2 * | 11/2018 | Barnes .................... | D01D 5/16 |
| 2014/0072758 | A1 * | 3/2014 | Arvidson ............... | F41H 5/0485 428/114 |

FOREIGN PATENT DOCUMENTS

CN        103668493 A  *  3/2014

* cited by examiner

*Primary Examiner* — Robert C Dye
*Assistant Examiner* — Taryn Trace Willett
(74) *Attorney, Agent, or Firm* — CBM Patent Consulting, LLC

(57) ABSTRACT

The present invention discloses a preparation method of polyester cord fabric with low denier and high modulus, including steps of: spinning, reducing melt discharge volume for extruding yarn with denier of 500-1000 D; using high-speed motor and heat roller, spinning speed of 6000-6500 m/min to produce raw yarn; performing initial and repeat twisting of raw yarn by straight twisting machine; performing weaving of twisted yarn using Dornier air-jet loom to produce cord fabric, when weaving and reeding-in, using two into a reed way, adding creel roller bearing and creel single spindle tension control belt to improve uniformity; performing dipping of cord fabric using two-bath dipping, adjusting temperature to 250-260 degrees Celsius, tension to 0.3-2.9 daN/each yarn of key area, running speed of yarn to 55-70 m/min. The polyester cord fabric with low denier and high modulus can reduce rolling resistance and fuel consumption, and improve performance.

6 Claims, No Drawings

PREPARATION METHOD OF POLYESTER CORD FABRIC WITH LOW DENIER AND HIGH MODULUS

This application is the U.S. national phase of International Application No. PCT/CN2015/094964 Filed on Nov. 19, 2015 which designated the U.S. and claims priority to Chinese Application Nos. CN201410676232.9 filed on Nov. 21, 2014, the entire contents of each of which are hereby incorporated by reference.

TECHNICAL FIELD

The present invention relates to a polyester cord fabric for use in car tires, in particular to a polyester cord fabric with low denier and high modulus for use in radial car tires.

BACKGROUND

Tires of car mainly support the weight of car body, provide the braking force and driving force, cushion the impact of road pavement, maintain or convert the direction of car and so on. With continuous development of economy, the requirements for car tires are getting higher and higher. Countries have introduced new standards for tires, and developed a labeling law. In 2012, Europe implemented a new labeling law, which must be labeled for all car tires, light truck tires, truck tires and bus tires sold in the EU to mark fuel efficiency, rolling noise and wet grip levels of tires. The introduction of this bill indicates that EU has clear requirements for three major performance of the tire: fuel economy (ie, tire rolling resistance requirements), wet road grip level, road noise level. The implementation of the EU labeling law indicates that more and more countries will develop appropriate standards for tires. So the improvement in tires performance will become particularly important to deal with these changes.

The cord fabric is the main skeleton of tyres of tires, and the improvement in the cord fabric performance is essential for the overall performance improvement of tires. Polyester dipped cord fabric has high fracture strength, low elongation at break and good dimensional stability. So it is widely used. At this stage, with the innovation of raw yarn technology, polyester dipped cord fabric has kinds of polyester cord fabric with ordinary high modulus and low shrinkage, polyester cord fabric with high strength, high modulus and low shrinkage, polyester cord fabric with high size, high stability, high modulus and low shrinkage, polyester dipped cord fabric with high strength, high dimensional stability, high modulus and low shrinkage, and other types. However, these dipped cord fabric lack of the improvement in reducing rolling resistance of tires, reducing fuel consumption, and improving tires performance.

At present, the radial tires are more application in the car. It is necessary to prepare a polyester dipped cord fabric with low denier (low diameter) and high modulus, which can effectively reduce rolling resistance of radial tires, reduce fuel consumption and improve tire performance.

DESCRIPTION

In view of drawbacks of the prior art, A purpose of the present invention is to provide a preparation method of polyester cord fabric with low denier and high modulus through using a new weaving process and a dipping process with modified low denier and high modulus polyester industrial yarn as raw material to production of the polyester cord fabric.

For achieving the above purpose, the present invention is realized through the following technical solution:

A preparation method of polyester cord fabric with low denier and high modulus, includes the following steps of:

1) spinning, reducing melt discharge volume for extruding yarn with denier of 500~1000 D; using high-speed motor and heat roller, and spinning speed of 6000~6500 m/min to produce raw yarn. Performing transformation of existing production line of high-modulus and low-shrinkage polyester, replacing metering pumps to reduce the melt discharge volume, thereby reducing fiber denier; changing microstructure of polyester polymer through ultra-high speed spinning, improving orientation degree of polymer, Thereby increasing strength and modulus of fiber;

2) twisting yarn, performing initial and repeat twisting of the raw yarn by a straight twisting machine to produce twisted yarn;

3) weaving, performing weaving of the twisted yarn by using a Dornier air-jet loom to produce a cord fabric, when weaving and reeding-in, using two into a reed way, and at the same time, adding creel roller bearing and creel single spindle tension control belt to improve uniformity of the fabric;

4) dipping, performing dipping of the cord fabric using two-bath dipping method, adjusting the temperature of a key area to 250-260 degrees Celsius, the tension of the key area to 0.3 to 2.9 daN/each yarn, running speed of yarn to 55 to 70 m/min to produce the polyester cord fabric with low denier and high modulus, tension and temperature design of the key area to achieve the purpose of high stretch and high retraction process of the cord fabric, dipping using two-bath dipping method to further improve orientation degree of product during dipping process. It can ensure heat shrinkage of the product, at the same time, reduce strong loss caused by heating and improve modulus.

Preferably, the preparation method of polyester cord fabric with low denier and high modulus, wherein the raw yarn has a modulus of 105 to 120 mN/dtex and a strength of 9.0 to 9.5 g/d.

Preferably, the preparation method of polyester cord fabric with low denier and high modulus, wherein the twist factors are both 430 to 435 of target twist of the initial and repeat twisting.

Preferably, the preparation method of polyester cord fabric with low denier and high modulus, wherein the cord fabric is dipped in ovenes, tension zones and glue grooves in turn in the step 4).

Preferably, the preparation method of polyester cord fabric with low denier and high modulus, wherein ovenes contain six ovenes with different temperature.

Preferably, the preparation method of polyester cord fabric with low denier and high modulus, wherein tension zones include five tension zones.

Preferably, the preparation method of polyester cord fabric with low denier and high modulus, wherein glue grooves contain a one-bath glue groove and a two-bath glue groove.

Preferably, the preparation method of polyester cord fabric with low denier and high modulus, wherein the polyester cord fabric with low denier and high modulus has a diameter range of 0.37 mm (500 D) to 0.54 mm (1000 D).

The advantages of the present invention are that the strength of the polyester cord fabric with low denier and high modulus is 160-180 N through the preparation method, and rolling resistance coefficient Cr is 9.5 to 11.0 of tires produced using the polyester cord fabric with low denier and high modulus. Rolling resistance of tires is reduced, the fuel consumption is also reduced, and tires performance is improved. Raw yarn and finished product modulus of the polyester cord fabric with low denier and high modulus prepared by the method is increased.

DETAILED DESCRIPTION

The present invention will now be described in further detail with reference to the accompanying drawings as required:

Embodiment 1

(1) The process parameters are as follows:

TABLE 1

The process parameters of the embodiment 1 of the preparation method of a polyester cord fabric with low denier and high modulus
Product specification PET 500D-1000D
Raw material Polyester raw yarn 500-1000D

| | Process control point | Process conditions | Unit |
|---|---|---|---|
| Spinning process | Spinning speed | 6000-6500 | m/min |
| Twisting yarn process | twist direction | S | / |
| | Target twist factors of initial and repeat twisting | 430-435 | / |
| | Rotational speed | 6600 | RPM |
| | Winch winding number | 6 | Circle |
| | Winding number of inner yarn tensioner | 6 | Circle |
| | Tensioner selection of creel | 50 | % |
| | Overfeeding | −1.5 | % |
| | Scale of inner yarn tensioner | 1.75 | / |
| Oven temperature | H1/H2 | 145-165 | degrees Celsius |
| | H3 | 250-260 | degrees Celsius |
| | H4/H5 | 145-165 | degrees Celsius |
| | H6 | 250-260 | degrees Celsius |
| Dipping speed | Dipping speed | 70 ± 5 | m/min |
| Tension of tension zone | Z2 | 0.5 ± 0.1 | daN/each yarn |
| | Z3 | 1.0 ± 0.1 | daN/each yarn |
| | Z5 | 1.9 ± 0.1 | daN/each yarn |
| | Z6 | 1.9 ± 0.1 | daN/each yarn |
| | Z7 | 0.30 ± 0.1 | daN/each yarn |

(2) The specific production process includes the following steps:

1) spinning: selecting modified polyester (HMLS) with high-modulus and low-shrinkage production line for spinning, replacing metering pumps to reduce the melt discharge volume, replacing high-speed motor and heat roller to provide spinning speed, and performing production using rotational speed of 6000~6500 m/min;

2) twisting yarn, performing twisting yarn of the raw yarn by a straight twisting machine, producing polyester twisted yarn with twist coefficient of 430~435 according to setting process parameters;

3) weaving, finishing weaving of the cord fabric by using a Dornier air-jet loom, when weaving and reeding-in, using two into a reed way, and at the same time, adding creel roller bearing and creel single spindle tension control belt to improve uniformity of the fabric;

4) dipping, producing fabric using a dipping machine, dipping successively six ovenes (ovenes temperature being 145~165 degrees Celsius; 250~260 degrees Celsius; 145~165 degrees Celsius; and 250~260 degrees Celsius) of H1/H2; H3; H4/H5; H6 with the speed of 70±5 m/min, five tension zone (the tension of the key area being 0.29 to 2.0 daN), and dipping effect by two-bath dipping method (an one-bath and a two-bath of polyester glue).

Polyester cord fabric with 500 D~1000 D is produced through the embodiment. Raw yarn has 2% elongation modulus of 116.58 mN/dtex and strength of 9.23 g/d. Dipped cord fabric has 2% elongation modulus of 126 mN/dtex and strength of 154.00 N.

Embodiment 2

(1) The process parameters are as follows:

TABLE 2

The process parameters of the embodiment 2 of the preparation method of a polyester cord fabric with low denier and high modulus
Product specification PET 500D-1000D
Raw material Polyester raw yarn 500-1000D

| | Process control point | Process conditions | Unit |
|---|---|---|---|
| Spinning process | Spinning speed | 6000-6500 | m/min |
| Twisting yarn process | twist direction | S | / |
| | Target twist factors of initial and repeat twisting | 430-435 | / |
| | Rotational speed | 6600 | RPM |
| | Winch winding number | 6 | Circle |
| | Winding number of inner yarn tensioner | 6 | Circle |
| | Tensioner selection of creel | 50 | % |
| | Overfeeding | −1.5 | % |
| | Scale of inner yarn tensioner | 1.75 | / |
| Oven temperature | H1/H2 | 145-165 | degrees Celsius |
| | H3 | 250-260 | degrees Celsius |
| | H4/H5 | 145-165 | degrees Celsius |
| | H6 | 250-260 | degrees Celsius |
| Dipping speed | Dipping speed | 65 ± 5 | m/min |
| Tension of tension zone | Z2 | 0.5 ± 0.1 | daN/each yarn |
| | Z3 | 1.0 ± 0.1 | daN/each yarn |
| | Z5 | 2.4 ± 0.1 | daN/each yarn |
| | Z6 | 2.4 ± 0.1 | daN/each yarn |
| | Z7 | 0.38 ± 0.1 | daN/each yarn |

(2) The specific production process includes the following steps:

1) spinning: selecting modified polyester (HMLS) production line for spinning, replacing metering pumps to reduce the melt discharge volume, replacing high-speed motor and heat roller to provide spinning speed, and performing production using rotational speed of 6000~6500 m/min;

2) twisting yarn, performing twisting yarn of the raw yarn by a straight twisting machine, producing polyester twisted yarn with twist coefficient of 430~435 according to setting process parameters;

3) weaving, finishing weaving of the cord fabric by using a Dornier air-jet loom, when weaving and reeding-in, using two into a reed way, and at the same time, adding creel roller bearing and creel single spindle tension control belt to improve uniformity of the fabric;

4) dipping, producing fabric using a dipping machine, dipping successively six ovenes (ovenes temperature being 145~165 degrees Celsius; 250~260 degrees Celsius; 145~165 degrees Celsius; and 250~260 degrees Celsius) of H1/H2; H3; H4/H5; H6 with the speed of 65±5 m/min, five tension zone (the tension of the key area being 0.3 to 2.9 daN), and dipping effect by two-bath dipping method (a one-bath and a two-bath of polyester glue).

Polyester cord fabric with 500 D~1000 D is produced through the embodiment. Raw yarn has 2% elongation modulus of 108.13 mN/dtex and strength of 8.81 g/d. Dipped cord fabric has 2% elongation modulus of 128 mN/dtex and strength of 160.35 N.

Embodiment 3

(1) The process parameters are as follows:

TABLE 3

The process parameters of the embodiment 3 of the preparation method of a polyester cord fabric with low denier and high modulus
Product specification PET 500D-1000D
Raw material Polyester raw yarn 500-1000D

| Process control point | | Process conditions | Unit |
|---|---|---|---|
| Spinning process | Spinning speed | 6000-6500 | m/min |
| Twisting yarn process | twist direction | S | / |
| | Target twist factors of initial and repeat twisting | 430-435 | / |
| | Rotational speed | 6600 | RPM |
| | Winch winding number | 6 | Circle |
| | Winding number of inner yarn tensioner | 6 | Circle |
| | Tensioner selection of creel | 50 | % |
| | Overfeeding | −1.5 | % |
| | Scale of inner yarn tensioner | 1.75 | / |
| Oven temperature | H1/H2 | 145-165 | degrees Celsius |
| | H3 | 250-260 | degrees Celsius |
| | H4/H5 | 145-165 | degrees Celsius |
| | H6 | 250-260 | degrees Celsius |
| Dipping speed | Dipping speed | 60 ± 5 | m/min |
| Tension of tension zone | Z2 | 0.5 ± 0.1 | daN/each yarn |
| | Z3 | 1.0 ± 0.1 | daN/each yarn |
| | Z5 | 2.9 ± 0.1 | daN/each yarn |
| | Z6 | 2.9 ± 0.1 | daN/each yarn |

TABLE 3-continued

The process parameters of the embodiment 3 of the preparation method of a polyester cord fabric with low denier and high modulus
Product specification PET 500D-1000D
Raw material Polyester raw yarn 500-1000D

| Process control point | Process conditions | Unit |
|---|---|---|
| Z7 | 0.38 ± 0.1 | daN/each yarn |

(2) The specific production process includes the following steps:

1) spinning: selecting modified polyester (HMLS) production line for spinning, replacing metering pumps to reduce the melt discharge volume, replacing high-speed motor and heat roller to provide spinning speed, and performing production using rotational speed of 6000~6500 m/min;

2) twisting yarn, performing twisting yarn of the raw yarn by a straight twisting machine, producing polyester twisted yarn with twist coefficient of 430~435 according to setting process parameters;

3) weaving, finishing weaving of the cord fabric by using a Dornier air-jet loom, when weaving and reeding-in, using two into a reed way, and at the same time, adding creel roller bearing and creel single spindle tension control belt to improve uniformity of the fabric;

4) dipping, producing fabric using a dipping machine, dipping successively six ovenes (ovenes temperature being 145~165 degrees Celsius; 250~260 degrees Celsius; 145~165 degrees Celsius; and 250~260 degrees Celsius) of H1/H2; H3; H4/H5; H6 with the speed of 60±5 m/min, five tension zone (the tension of the key area being 0.3 to 2.9 daN), and dipping effect by two-bath dipping method (a one-bath and a two-bath of polyester glue).

Polyester cord fabric with 500 D~1000 D is produced through the embodiment. Raw yarn has 2% elongation modulus of 110.10 mN/dtex and strength of 9.10 g/d. Dipped cord fabric has 2% elongation modulus of 131 mN/dtex and strength of 158.61 N.

The dipping rates of embodiments 1, 2 and 3 are successively reduced, and the tension is successively increased. By adjusting the dipping speed and the tension, the straightness of its microscopic polymer is increased when the cord fabric is in a high tension state, so that crystalline morphology of lamellar crystal is further expanded, and the modulus of the cord fabric is finally improved.

Product indicators of the above three embodiments are in the following table:

TABLE 4 product performance indicators of raw yarn and product of embodiments 1, 2 and 3

| | Raw yarn | | Dipped cord fabric | |
|---|---|---|---|---|
| Name | 2% elongation modulus (mN/dtex) | Strength (g/d) | 2% elongation modulus (mN/dtex) | Strength N |
| Embodiment 1 | 116.58 | 9.23 | 126 | 154.00 |
| Embodiment 2 | 108.13 | 8.81 | 128 | 160.35 |
| Embodiment 3 | 110.10 | 9.10 | 131 | 158.61 |

Although the embodiments of the present invention have been disclosed above, they are not limited to the applications previously mentioned in the specification and embodiments, and can be applied in various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. A method for preparing a polyester cord fabric, being characterized in that, includes the following steps of:
   1) reducing melt discharge volume for extruding a yarn with denier of 500-1000 by using a motor to move a heat roller at speed of 6000~6500 m/min to produce a raw yarn;
   2) twisting the raw yarn by a straight twisting machine to produce a twisted yarn;
   3) performing weaving of the twisted yarn by using an air-jet loom with a two-in-one entry method to produce a cord fabric; adding a creel roller bearing and a creel single spindle tension control belt for improving uniformity of the cord fabric;
   4) performing dipping of the cord fabric by using a two-bath dipping method, adjusting temperature to 250-260 degrees Celsius, tension to 0.3 to 2.9 daN/each yarn, speed of the cord fabric to 55 to 70 m/min to produce the polyester cord fabric;
   wherein the raw yarn has a modulus of 105 to 120 mN/dtex and a strength of 9.0 to 9.5 g/d.

2. The method according to claim 1, being characterized in that, the cord fabric is dipped in ovens, tension zones and glue grooves in turn in the step 4).

3. The method according to claim 2, being characterized in that, ovens contain six ovens with different temperature.

4. The method according to claim 3, being characterized in that, tension zones include five tension zones.

5. The method according to claim 4, being characterized in that, glue grooves contain an one-bath glue groove and a two-bath glue groove.

6. The method according to claim 5, being characterized in that, the polyester cord fabric has a diameter range of 0.37 mm to 0.54 mm.

* * * * *